(12) United States Patent
Locker et al.

(10) Patent No.: US 12,505,388 B2
(45) Date of Patent: Dec. 23, 2025

(54) VIRTUAL QUEUING SYSTEM

(71) Applicant: ATTRACTION TECHNOLOGY, Staffordshire (GB)

(72) Inventors: Mark Locker, Staffordshire (GB); Peter O'Dare, Staffordshire (GB); Robert Pugh, Staffordshire (GB)

(73) Assignee: ATTRACTION TECHNOLOGY, Staffordshire (GB)

( * ) Notice: Subject to any disclaimer, the term of this patent is extended or adjusted under 35 U.S.C. 154(b) by 0 days.

(21) Appl. No.: 18/556,739

(22) PCT Filed: Apr. 22, 2022

(86) PCT No.: PCT/EP2022/060785
§ 371 (c)(1),
(2) Date: Oct. 23, 2023

(87) PCT Pub. No.: WO2022/223830
PCT Pub. Date: Oct. 27, 2022

(65) Prior Publication Data
US 2024/0242133 A1 Jul. 18, 2024

(30) Foreign Application Priority Data
Apr. 23, 2021 (EP) ..................................... 21170313

(51) Int. Cl.
*G06Q 10/02* (2012.01)
(52) U.S. Cl.
CPC .................................... *G06Q 10/02* (2013.01)
(58) Field of Classification Search
CPC ..................................................... G06Q 10/02
See application file for complete search history.

(56) References Cited

U.S. PATENT DOCUMENTS

| | | |
|---|---|---|
| 2013/0151296 A1 | 6/2013 | Waytena et al. |
| 2017/0270734 A1 | 9/2017 | Geraghty et al. |
| 2018/0240161 A1 | 8/2018 | Cronin et al. |

FOREIGN PATENT DOCUMENTS

| | | | |
|---|---|---|---|
| AU | 2019204214 A1 | * | 1/2021 |
| WO | 2018236209 A1 | | 12/2018 |

OTHER PUBLICATIONS

Yan Wang, Tracking human queues using single-point signal monitoring, 2014, p. 42-44 (Year: 2014).*

(Continued)

*Primary Examiner* — Ibrahim N El-Bathy
(74) *Attorney, Agent, or Firm* — Morgan, Lewis & Bockius LLP

(57) ABSTRACT

The invention relates to a virtual queuing system for managing a virtual queue for a resource, the system comprising a plurality of user devices and a virtual queue management unit, where each user device is configured to: allow a user to join a virtual queue for the resource by creating a virtual queue entry associated with the user device; wherein the virtual queue management unit is configured to: maintain a virtual queue comprising a sequence of virtual queue entries; and manage the virtual queue by sequentially removing virtual queue entries from the virtual queue and providing each user device associated with a removed virtual queue entry with an access pass allowing the user to access the resource; wherein the virtual queue management unit is further configured to: receive user behaviour data associated with one or more virtual queue entries that are within the virtual queue or that have been removed from the virtual queue; and vary the management of the virtual queue in response to the received user behaviour data. By using behaviour data associated with the virtual queue entries the system can more reliably match the supply of users to the actual throughput of the resource so that the capacity of the (Continued)

resource remains saturated while ensuring that a physical queue at the resource does not exceed a desired level.

18 Claims, 3 Drawing Sheets

(56) References Cited

OTHER PUBLICATIONS

International Search Report for corresponding International Patent Application No. PCT/EP2022/060785 dated Aug. 18, 2022, 4 pages.

* cited by examiner

VIRTUAL QUEUING SYSTEM

CROSS REFERENCE TO RELATED APPLICATIONS

This application is a 371 National Stage Entry of International Patent Application No. PCT/EP2022/060785, filed Apr. 22, 2022, which claims priority to EP Patent Application No. 21170313.7 filed Apr. 23, 2021, each of which is hereby incorporated by reference in its entirety for all purposes.

TECHNICAL FIELD

The present invention relates to a virtual queueing system and method for managing a virtual queue for a resource such as an attraction. More particularly, the invention relates to a system for allowing users of a resource to create a virtual queue entry, which progresses through a virtual queue, minimising the requirement for them to queue physically at the resource.

BACKGROUND

In many situations where demand for a resource or service exceeds immediate supply, such as when visiting a theme park or when attending an out-patients department of a hospital, users of the resource or service are typically required to join a physical queue to wait in the order they arrived to access the resource. Generally during the queuing time the users within the physical queue are constrained to remain in a particular physical location and are not free to move around or engage in other activities. This is not only a source of user dissatisfaction but also is undesirable for service operators where it can often have a direct economic impact by discouraging users from attending or returning to the resource and restrict them from using other services while they are queuing. More recently, COVID-19 has further limited the possibility of people physically gathering close to resources in large numbers, which in many instances has prevented service providers from remaining open or being able to operate at full capacity.

Virtual queueing has been recognised as a solution to these problems, allowing users to join a virtual queue rather than a physical queue such that they do not need to be physically present during the queueing time, reducing the associated health concerns and allowing them to take part in other activities. Virtual queueing systems may operate in parallel with, or in place of, physical queues. Such systems operate by tracking a user's progress through the queue and provide some form of indication when the person has reached the front of the virtual queue and is therefore entitled to access the resource. Thus, by recording the users' positions in the queue and subsequently tracking progress, the system eliminates the need for its users to physically remain in line.

Prior art virtual queueing systems generally operate by providing the user with an electronic device allowing them to join a virtual queue for a resource. The system will use some form of central server for managing the virtual queue and will provide the electronic device with an access key (equivalently referred to as an "access pass") when the user reaches the front of the virtual queue. The access key may be authenticated at an entrance to the resource, either by an operator who checks the key or by an automated system which scans the key, to allow the user access to the resource. Since the users are not restricted to remaining close to the resource while in the virtual queue, social distancing can be maintained, allowing the user to spend this time on other activities. In the particularly relevant example of virtual queueing systems deployed at a theme park, users can for example continue to move around the park, possibly using other attractions or making purchases, while they are in the virtual queue.

Despite making progress over some of the above identified issues, such known virtual queueing systems still face a number of significant problems. One such issue is effectively managing the queue when the resource throughput (i.e. the number of users using the resource per hour) varies and during temporary closure of the resource, as is to be expected over a certain period of operation. In such circumstances it is difficult for virtual queuing systems to provide access passes to those at the front of the queue at the correct rate to ensure that ride capacity is effectively optimised whilst not leading to a significant physical queue developing at the entrance to the resource. Managing the virtual queue to effectively and reliably maintain this balance for prolonged periods of time during variations in demand and throughput has not yet been demonstrated in prior art systems.

A further significant problem identified by the inventors is that by removing the requirement to invest time in queueing for a resource, a significant number of users in a virtual queue will not use their access pass to access the resource. This results in underutilized capacity and means that users will have to queue longer than they should if the resource was operating at closer to full capacity. A related issue is ensuring that the access pass remains active for the required amount of time to allow the user to access the resource, without providing too long an access period which would make it difficult to predict the number of users arriving at a resource at any one time.

Accordingly there exists a need for an improved virtual queueing system which makes progress in addressing these issues.

SUMMARY OF THE INVENTION

The present invention seeks to provide a virtual queuing system and method for managing a virtual queue which improves on the above prior art systems and makes progress in addressing one or more of the above identified problems with known systems.

According to a first aspect of the invention, there is provided virtual queuing system for managing a virtual queue for a resource, the system comprising a plurality of user devices and a virtual queue management unit, where each user device is configured to: allow a user to join a virtual queue for the resource by creating a virtual queue entry associated with the user device; wherein the virtual queue management unit is configured to: maintain a virtual queue comprising a sequence of virtual queue entries; and manage the virtual queue by sequentially removing virtual queue entries from the virtual queue and providing each user device associated with a removed virtual queue entry with an access pass allowing the user to access the resource; wherein the virtual queue management unit is further configured to: receive user behaviour data associated with one or more user devices; and vary the management of the virtual queue in response to the received user behaviour data.

By using user behaviour data the system can more reliably match the supply of users to the actual throughput of the resource so that the capacity of the resource remains saturated while ensuring that a physical queue at the resource does not exceed a desired level. In this way, users are not restricted to remain in a single location so that they can use their time in the virtual queue for other activities and social distancing requirements can be met with greater certainty. The present invention allows for both (1) the real-time resource throughput to be known with greater certainty and (2) the actual supply of users provided by the de-queuing rate to be more accurately controlled to meet the required balance in utilising the resource capacity without increasing the physical queue beyond required levels.

The user behaviour data preferably comprises user behaviour data associated with one or more virtual queue entries that are within the virtual queue or that have been removed from the virtual queue. In other examples, user behaviour data associated with user devices that are not associated with virtual queue entries within the virtual queue or that have been removed from the virtual queue. In some examples user behaviour data comprises data associated with users in a physical queue for the resource.

User behaviour data preferably comprises one or more of: data corresponding to past user behaviour, data corresponding to current user behaviour or data predictive of future user behaviour. User behaviour data preferably encompasses (1) data usable to measure a parameter relating to current use of a resource, for example one or more of throughput, physical queue population, user distribution around the resource; and (2) data predictive of future use of a resource, for example data predictive of whether a user or group of users will use their access pass to access the resource, or the time it will take for a user to travel to and/or use a resource.

User behaviour preferably comprises one or more of location data or user device usage data received from a user device; usage data received from a remote device or system in communication with the virtual queuing system; user profile data. Location data preferably comprises geographic position data of the user device, such as GPS data.

Usage data preferably comprises data associated with a user's interaction with the user device. Preferably the user device comprises a smart user device, for example a smartphone, tablet, wearable device or personal computer. Preferably the user device is configured to download and run software (e.g. an "app") and the usage data comprises data associated with use of the software. Examples of usage data include data associated with use of the user device to create a virtual queue entry, make a reservation, make a purchase, check into a hotel, receive an alert or notification, navigate around a site, use a calendar or planner, view displayed information such as an advertisement.

Preferably the virtual queue management unit is configured to receive data associated with a user's use of a remote device or system. Examples of another remote device or system include a parking system, a hotel booking system, a restaurant booking system, a database storing user information.

User profile data preferably comprises user specific data predictive of user behaviour. User profile data may comprise one or more of: demographic data, historical use data or historical behaviour data.

The resource may be any facility or service at which demand at any one time may exceed supply, thereby requiring users to queue. Examples of such a resource include theme parks, shops, restaurants, doctors' surgeries, clinicians and hospital services, airport check in and security.

The access pass preferably comprises an electronic access key. Preferably the user device is configured to display the access pass so that it can be authenticated. Preferably the access pass is configured to be authenticated by an electronic device, for example by scanning the access pass with the electronic device to extract data. The access pass preferably comprises a barcode or a JSON Web Token. The access pass may be generated by the virtual queue management and sent to the user device or generated by the user device upon instruction from the virtual queue management unit.

A user device and a virtual queue entry may be associated with one or more users. For example, a single user device may be used to create a virtual queue entry for a group of two or more users, i.e. a virtual queue entry may be associated with a plurality of users.

A virtual queue entry comprises data defining details of the virtual queue reservation. A virtual queue entry may comprise a timestamp indicating the time that the virtual queue entry was created, wherein the virtual queue management unit may be configured to remove virtual queue entries from the virtual queue in sequence according to the timestamp. The virtual queue entry may comprise an initial timestamp indicating the time the virtual queue entry was created and a priority timestamp, wherein the virtual queue management unit is configured to remove virtual queue entries according to their priority timestamp. The priority timestamp may be initially set to the initial timestamp but may be adjusted by the virtual queue management unit or user device. For example, the queue management unit may be configured to apply time credits by subtracting a period of time from the priority timestamp. The virtual queue entry may comprise the number of users associated with the virtual queue entry. Virtual queue entries may be stored on a memory and managed by the virtual queue management unit. A user device is preferably configured to send a request to the virtual queue management unit to instruct the virtual queue management unit to create the virtual queue entry.

A virtual queue entry preferably comprises a label indicating a current status of the virtual queue entry. The current status may be represented by an enum. For example, the current status enum can indicate one or more of: (1) the virtual queue entry is in the virtual queue, (2) the user has been sent to a physical queue for the resource, e.g. the boarding area, (3) the user is in the physical queue for the resource, (4) the user has passed through the physical queue and gained access to the resource, (5) the user has left the resource and the reservation is complete. The enum may be updated based on one or more of: data received from one or more access control devices; location data or usage data received from one or more user devices.

Preferably the virtual queue entries are stored in a memory. Preferably the virtual queue management unit is configured to access the memory to manage the sequence of virtual queue entries, for example by writing new virtual queue entries, editing virtual queue entries and deleting virtual queue entries.

Preferably the virtual queuing system further comprises an access control device configured to authenticate an access pass on a user device. The access control device may preferably comprise a scanner for scanning the access pass to extract data from the access pass and confirm its validity. The access control device is preferably configured to send data corresponding to authenticated access passes to the virtual queue management unit. The access control device may be operated by an operator, for example a smart user device running software allowing authentication of an access pass or it may be an automated access control device such as an automatic barrier.

Preferably the virtual queue management unit is additionally configured to receive user behaviour data associated with users yet to create a virtual queue entry. For example the virtual queue management unit may receive location data from one or more user devices not associated with a current or previous virtual queue entry and such location data may be used to vary management of the virtual queue.

In some examples the system is configured for managing a virtual queue for a resource within a site having one or more resources, wherein the virtual queue management unit is configured to receive user behaviour data associated with one or more user devices located within the site. In this way, the virtual queue management unit may receive user behaviour data from user devices associated with users not presently using the resource but who's behaviour may be taken into account in managing the virtual queue for a resource. For example, the queue management unit may be configured to receive location data from a plurality of user devices associated with users within the site and vary the management of the virtual queue in response to the location data. More specifically, the location data may be received from user's not current using the resource. In this way, if a certain location within the site is identified as being particularly busy the management of the virtual queue can be varied appropriately, for example the set time of the access pass can be extended to account for the longer time it is expected to take for a user with an access pass to navigate through the busy location within the site to reach the resource.

Preferably the step "vary the management of the virtual queue in response to the user behaviour data received from the user device" comprises selecting or varying one or more parameters associated with the queue management process based on the user behaviour data received from one or more user devices, preferably user devices associated with either virtual queue entries within the virtual queue or virtual queue entries removed from the virtual queue. Preferably varying the management of the virtual queue comprises varying one or more of: a de-queuing rate at which virtual queue entries are removed from the virtual queue and provided with an access pass; a number of virtual queue entries removed from the virtual queue and provided with an access pass; a selection of which virtual queue entries within the virtual queue are removed; a set time in which the access pass remains valid and usable to access the resource.

The de-queuing rate preferably defines how often virtual queue entries are removed from the virtual queue and the associated user device provided with an access pass. In this way the supply of users called to a resource may be varied to balance a changing throughput of the attraction.

The virtual queue management unit is preferably configured to determine a number of users to be removed from the virtual queue or a de-queuing rate at which virtual queue entries are removed from the virtual queue using location data of user devices associated with current virtual queue entries and/or removed virtual queue entries. In particular, the queue management unit may use a "de-queueing rate" as an adjustable parameter or it may vary the number of users removed from the virtual queue in response to an event, such as when it is determined a user has left the physical queue, thereby indirectly varying the de-queuing rate. In this way, location data can be used to more accurately determine one or both of: (1) the number of users required to optimally utilise capacity based on the current running of the resource and (2) the actual supply of users for a given number removed from the virtual queue, thereby allowing supply of users to be accurately matched to current capacity.

The virtual queue management unit is preferably configured to determine a throughput value for the resource using location data received from user devices associated with virtual queue entries removed from the queue; use the throughput value to determine a de-queuing rate at which virtual queue entries are removed from the virtual queue. The throughput value preferably comprises a rate at which users are using the resource. The throughput value preferably comprises a number representing the number of users using the resource per unit time period, for example per hour. The throughput value may be estimated by monitoring the rate at which user devices pass through a location corresponding to the resource. The de-queuing rate may be set equal to the determined throughput value or may be set to a value above the determined throughput value, thereby accounting for users who do not use their access pass to access the resource.

Preferably the virtual queue management unit is configured to determine a de-queuing rate at which virtual queue entries are removed from the virtual queue using a throughput value for the resource and an adjustment factor representing a forecasted proportion of users provided with an access pass who will not access the resource, such that the de-queuing rate is greater than the throughput of the resource; wherein the adjustment factor is determined based on received user behaviour data associated with current or removed virtual queue entries.

The virtual queue management unit may be configured to determine the throughput using one or more of: location data, data received from one or more access control devices, a predetermined constant or time dependent value of throughput.

The virtual queue management unit may be configured to determine the adjustment factor based on a location data received from one or more user devices associated with current or removed virtual queue entries. For example, the virtual queue management unit may be configured to increase the adjustment factor if the received location data indicates that one or more user devices are beyond a threshold distance from the resource and/or moving away from the resource.

The virtual queue management unit is preferably configured to determine the adjustment factor based on usage data of the user devices associated with current or removed virtual queue entries, wherein usage data preferably comprises app usage data of an application running on the user device. For example, the queue management unit may be configured to increase the adjustment factor if the received usage data indicates conflicting use of one or more user devices, for example within a predetermined duration of the associated virtual queue entry being removed from the virtual queue. The conflicting use may be, for example, one or more of: making a purchase, making a reservation, receiving a notification or alert, joining a virtual queue of another resource.

The virtual queue management unit may be configured to determine the adjustment factor by inputting the received user behaviour data into a model for calculating the adjustment factor. The model may be a regression model. Preferably the model comprises a machine learning model trained using historical user behaviour data to predict whether a user will access the resource from the input user behaviour data.

The virtual queue management unit is preferably configured to use the received user behaviour data to select which virtual queue entries are to be removed from the virtual queue. The virtual queue management unit may be configured to determine users more likely to access the resource than others based on the received user behaviour data e. The virtual queue management unit may be configured to remove a first virtual queue entry ahead of a second virtual queue entry which is at a relatively more advanced position in the virtual queue when the queue management unit determines, based on the received user behaviour data, that the first virtual queue entry is associated with a user more likely to access the resource. For example, the virtual queue management unit may be configured to select the first virtual queue entry ahead of the second virtual queue entry if one or more of the following is true (1) the received location data indicates that the user device of the first virtual queue entry is closer to the attraction; (2) the received location data indicates that the user device associated with the second virtual queue entry is moving away from the attraction; (3) the received usage data indicates conflicting use of the user device associated with the second virtual queue entry, where conflicting use preferably comprises one or more of making a purchase, making a reservation, receiving a notification or alert, joining a virtual queue of another resource.

Preferably the virtual queuing system is configured for use with a resource having a physical queue at an entrance to the resource. Preferably the virtual queueing system is configured to maintain a physical queue at an entrance to the resource. Preferably the queue management unit is configured to determine the number of users in the physical queue and control the number of virtual queue entries removed from the virtual queue and provided with an access pass to maintain a target number of users within the physical queue. By selecting an appropriate target population of the physical queue it can be ensured that the resource capacity is saturated while limiting the target population to prevent users having to physically queue in the same location for too long. The population of the physical queue may be determined using one or more of: location data, data received from one or more access control devices and manual input.

The queue management unit may be configured to determine the number of virtual queue entries removed from the virtual queue using the determined number of users in the physical queue and an adjustment factor representing a forecasted proportion of users provided with an access pass who will not access the resource, such that the number of users removed from the virtual queue is greater than the number of users required to maintain the target number of users in the physical queue; wherein the adjustment factor is determined based on the received user behaviour data associated with current or removed virtual queue entries. The methods of determining the adjustment factor defined above apply equally to these examples.

The virtual queuing system may comprise one or more access control devices, each configured to authenticate an access pass on a user device to allow a user access to the resource. The access control devices are preferably configured to send data corresponding to authenticated passes to the queue management unit, the queue management unit configured to use the data to determine the number of users in the physical queue. The queue management unit is preferably configured to determine the number of users authenticated by the access control device from the data received. The virtual queueing system may comprise an access control device configured to be positioned at the entrance to the physical queue, wherein the queue management unit is configured to determine the number of users in the physical queue based on the number of users authenticated by the access control device and the throughput of the resource, where the throughput of the resource may be determined by one or more of: location data, data received from a second access control unit, manual input, a stored fixed constant or function. Alternatively, the virtual queuing system may comprise a first access control device positioned the entrance to the physical queue and a second access control device at the end of the physical queue at the entrance to the resource, wherein the queue management unit may calculate the physical queue population directly from the data received from the first and second access control devices.

The virtual queue management unit may be configured to estimate the number of users in the physical queue using location data received from user devices associated with current or removed virtual queue entries. The virtual queue management unit is preferably configured to change the de-queuing rate or a number of virtual queue entries removed from the virtual queue according to the estimated number of users in the physical boarding queue. The virtual queue management unit may be configured to: determine when the estimated number of users in the physical queue drops below a threshold value; determine one or more virtual queue entries within the virtual queue corresponding to users that are more likely to access the resource than other users in the virtual queue based on the received user behaviour data; and provide the user devices associated with the one or more virtual queue entries with an access pass for accessing the resource.

In some examples the virtual queue management system is configured for use with a resource having a physical queue at an entrance to the resource, where the physical queue may comprise a merge point at location part way along the physical queue, wherein the access pass allows a user removed from the virtual queue to access the resource at the merge point. In these examples, the resource may have a physical queue (i.e. a primary physical queue) which functions as a normal queue. The access pass generated on a user device allows the user to join the queue at a merge point on the primary physical queue, where the merge point is preferably positioned towards the front of the physical queue. In these examples the "boarding queue", as referred to herein, may be considered a portion of the primary physical queue ahead of the merge point and possibly comprising a physical queue at the merge point.

The queue management unit may be configured to determine the number of users in the primary physical queue and/or the boarding queue (i.e. a portion of the primary physical queue ahead of the merge point) and vary management of the virtual queue in response to the determined number of users. The number of users in the primary physical queue (and/or the boarding queue portion of the physical queue) may be determined by behavioural data, particularly location data, received from the user devices of users in the primary physical queue. Alternatively, the numbers of users in the primary physical queue and/or the boarding queue may be determined by one or more access control units, for example an access control unit positioned at the merge point and/or an access control unit positioned at an entrance to the physical boarding queue.

The queue management unit may be configured to vary the management of the virtual queue in response to user behaviour data received from user devices associated with users in the physical queue (the primary physical queue and/or the boarding queue). In one example the queue management unit is configured to vary a number of users removed from the virtual queue and provided with an access pass or the de-queueing rate at which virtual queue entries are removed from the virtual queue in response to the received user behaviour data associated with users in the physical queue. The user behaviour data may comprise user sentiment data representing the satisfaction of the users in the physical queue. For example if user sentiment data indicates decreasing satisfaction of users in the physical queue, the de-queueing rate or number of users removed from the virtual queue may be reduced.

User sentiment data may be determined based on user device location data and/or user device usage data. For example, if location data of users in the physical queue indicates users are leaving the physical queue, this is indicative of decreasing user satisfaction. The queue management unit may reduce the de-queuing rate or number of users removed from the virtual queue in response to manage the wait time in the physical queue and increase user satisfaction. User sentiment may be determine more accurately by determining changes in a rate of users leaving the physical queue based on location data. It may also determine user sentiment based on user device usage, such as increased unrelated smart phone usage which could be indicative or reducing level of satisfaction with their current experience. In this way, the number of users using the virtual queue may be maximised whilst managing user satisfaction in the primary physical queue. This is particularly important in examples where the virtual queue is run as a premium queue option and allows users to join at a merge point near the front of the physical queue, thus potentially leading to longer wait times in the physical queue.

Determining one or more virtual queue entries corresponding to users that are more like to access the resource may comprise one or more of: determining one or more virtual queue entries within the virtual queue corresponding to user devices closer to the resource than others in the virtual queue using location data received from the user devices; determining conflicting use of one or more user devices associated with virtual queue entries based on usage data received form the user devices and selecting one or more virtual queue entries associated with user devices that are not displaying conflicting use, where conflicting use may comprise one or more of making a purchase, making a reservation, receiving a notification or alert, joining a virtual queue of another resource.

Preferably the access pass comprises an electronic key that is only valid for a set time (also referred to as a set duration or set period). The access pass is preferably configured such that it can only be authenticated by an access control unit within the set time. The virtual queue management unit is preferably configured to determine a set time period that the generated access pass provided to a user device remains active and usable to access the resource. The virtual queue management unit may determine the set time period in response to one or more of the following: the distance of the user from the resource based on location data received from the corresponding user device; the identification of conflicting use of the user device based on usage data received from the user device, wherein the set time may be extended if conflicting use is detected; the number of users determined to be in the physical queue for the resource; the number of uses determined to be within a predetermined distance of the resource. The virtual queuing system of this example preferably comprises an access control device configured to be positioned at the end of the physical queue, before the entrance to the resource.

In some examples the virtual queue management unit is configured for use with a resource having a physical queue at an entrance to the resource, the access pass provided to a user device allowing the user to access the resource at a merge point in the physical queue; wherein the virtual queue management unit is configured to receive user behaviour data from user devices associated with users in the physical queue and vary the management of the virtual queue in response to the received user behaviour data. The merge point is a position within the physical queue other than the start (i.e. the back) of the physical queue. Preferably the merge point is at an advanced position within the physical queue such as near the front of the queue, near the entrance to the resource. In this way, the virtual queue may allow a user to skip a portion of the physical queue and join nearer the front of the queue.

In these examples, although the virtual queue bypasses a portion (or a majority) of the physical queue, management of the virtual queue may be carried out in response to user behaviour data received from user devices associated with users in the entirety of the physical queue. In particular user behaviour data associated with the users in the physical queue may be used to determine user sentiment or the number of users in the physical queue and the management of the virtual queue may be varied in response, for example by changing the dequeuing rate or number of users de-queued at any a time.

Preferably user behaviour data associated with users in the physical queue comprises user sentiment data, where user sentiment data is determined based on one or more of: location data of a user device; user device usage data; a user response to a message sent to a user device. Location data of user devices in the physical queue may be used to count the number of users present and the virtual queue may be managed in response. Alternatively location data indicating the an increased rates of users are leaving the physical queue may be determined as reducing user satisfaction and the rate at which users are removed from the virtual queue and provided with an access pass may be reduced to prevent the wait time in the physical queue becoming too long and user satisfaction deteriorating. In some examples the virtual queue management unit may be configured to send a satisfaction query to a user device and receive a response to the satisfaction query in response. The virtual queue management unit may be configured to vary management of the virtual queue in response to user response to the satisfaction query to manage user satisfaction in the physical queue while maximising use of the virtual queue (which bypasses a portion of the physical queue).

Preferably the queue management unit is configured to vary the dequeuing rate or the number of users removed the virtual queue and provided with an access pass based on user sentiment data received from the users within the physical queue.

Preferably the virtual queue management unit is configured for use with a resource having a physical queue at an entrance to the resource, the access pass provided to a user device allowing the user to access the resource at a merge point in the physical queue; wherein the virtual queue management unit is configured to determine the number of users in the physical queue and vary management of the virtual queue in response to the number of users in the physical queue.

In a second aspect of the invention there is provided a computer implemented method of managing a virtual queue for a resource, the method comprising: creating a virtual queue entry associated with a user device; maintaining a virtual queue comprise a sequence of virtual queue entries, each associated with a user device; managing the virtual queue by sequentially removing virtual queue entries from the virtual queue and providing the user devices associated with the removed virtual queue entries with an access pass configured to provide access to the resource; varying management of the virtual queue in response to user behaviour data associated with one or more user devices. Preferably the management of the virtual queue is varied in response to user behaviour data associated with one or more virtual queue entries that are within the virtual queue or that have been removed from the virtual queue. The user behaviour data preferably comprises one or both of location data and usage data associated with the user device. The details described above and herein in the context of the system of the first aspect apply equally to the method of second aspect.

In a third aspect of the invention there is provided a virtual queuing system for managing a virtual queue for a resource, the system comprising a user device and a virtual queue management unit, where the user device is configured to allow a user to join a virtual queue for the resource by creating a virtual queue entry associated with the user device; wherein the virtual queue management unit configured to: maintain a virtual queue comprising a sequence of virtual queue entries; and manage the virtual queue by sequentially removing virtual queue entries from the virtual queue at a de-queuing rate and providing each user device associated with a removed virtual queue entry with an access pass allowing the user to access the resource; wherein the queue management unit is configured to calculate the de-queuing rate using a throughput value for the resource and an adjustment factor representing a forecasted proportion of users provided with an access pass who will not access the resource, such that the de-queuing rate is greater than the throughput of the resource.

Preferably the adjustment factor varies with time. For example the queue management unit may be configured to use a function to calculate the adjustment factor, where the function has time as a dependent variable. The inventors have determined that the no-show rate often varies predictably during the day and therefore this allows the system to more accurately match supply to the capacity of the resource.

Preferably the queue management unit is configured to calculate the adjustment factor using a model which takes as input variables one or more of: the time of day; a number of access passes which are not used to access the resource within a preceding predetermined time period; location data received from one or more user devices for example a number of user devices which are determined to be beyond a predetermined distance of the resource; usage data received from one or more user devices, for example a number of user devices which have been used for a particular activity within a preceding predetermined time period, wherein the activity may comprise conflicting use of the user device, for example one or more of: making a purchase, making a reservation, receiving a notification or alert, joining a virtual queue of another resource.

Preferably the virtual queuing system further comprises an access control unit configured to validate an access pass on a user device to allow a user access to the resource; wherein the access control unit is configured to send data representing validated access passes to the virtual queue management unit. Preferably the virtual queue management unit is configured to calculate a loss factor based on data received from the access control unit, where the loss factor is the proportion of virtual queue entries provided with an access pass that are not validated by the access control unit over a predetermined past period of time; and use the loss factor to determine the adjustment factor when calculating the de-queueing rate.

Preferably the virtual queue management unit is configured to model a variation in the loss factor over a preceding period of time and use the model to estimate a current or future loss factor and use the estimated current or future loss factor as the adjustment factor used to calculate the de-queuing rate. The model may be a linear or polynomial regression model. Preferably the model comprises a quadratic model in which the adjustment factor increases with time during the day.

Preferably the access pass is configured to remain valid and usable to allow access to a resource for a set time period and the access control unit is configured to determine whether the access pass is valid; wherein the queue management unit is configured to determine the loss factor within a predetermined period running up until a point corresponding to the current time minus the set time period. In this way, the system uses the most up to date and complete data on the value of the loss factor in order to predict the current or future loss factor.

Preferably the virtual queuing system is configured for use with a resource that has a physical boarding queue at an entrance to the resource, wherein the access control unit is configured to be positioned at the end of the physical boarding queue and to send data corresponding to validated access passes to the queue management unit; wherein the virtual queue management unit is configured to use the rate at which access passes are validated by the access control unit as the throughput value. In this way the system has an accurate measure of the resource throughput so can more precisely match user supply to the known throughput.

The queue management unit is preferably configured to: use a model to calculate the loss factor wherein the model takes as input location data and/or user device usage data corresponding to virtual queue entries. Preferably the queue management unit uses a model which takes as input a current number of virtual queue entries corresponding to user devices located beyond a predetermined distance of the resource and/or moving away from the resource to estimate a current or future loss factor and use the estimated loss factor to determine the adjustment factor.

The virtual queue management unit is preferably configured to calculate a wait time for a particular virtual queue entry using the number of queue entries ahead of the particular virtual queue entry, the throughput of the resource and the adjustment factor; wherein the user device is configured to display the calculated wait time.

The virtual queue management unit is preferably configured to remove a queue entry from the virtual queue if the user device associated with the queue entry is determined to have left a predetermined location. The virtual queue management unit may be configured to determine whether a user device has left an area bounded by a geo-fence.

The third aspect of the invention may incorporate any one or more of the features described with respect to the first and second aspect.

BRIEF DESCRIPTION OF THE DRAWINGS

Embodiments of the invention will now be described, by way of example only, with reference to the accompanying drawings, in which.

DETAILED DESCRIPTION

Figure 1:
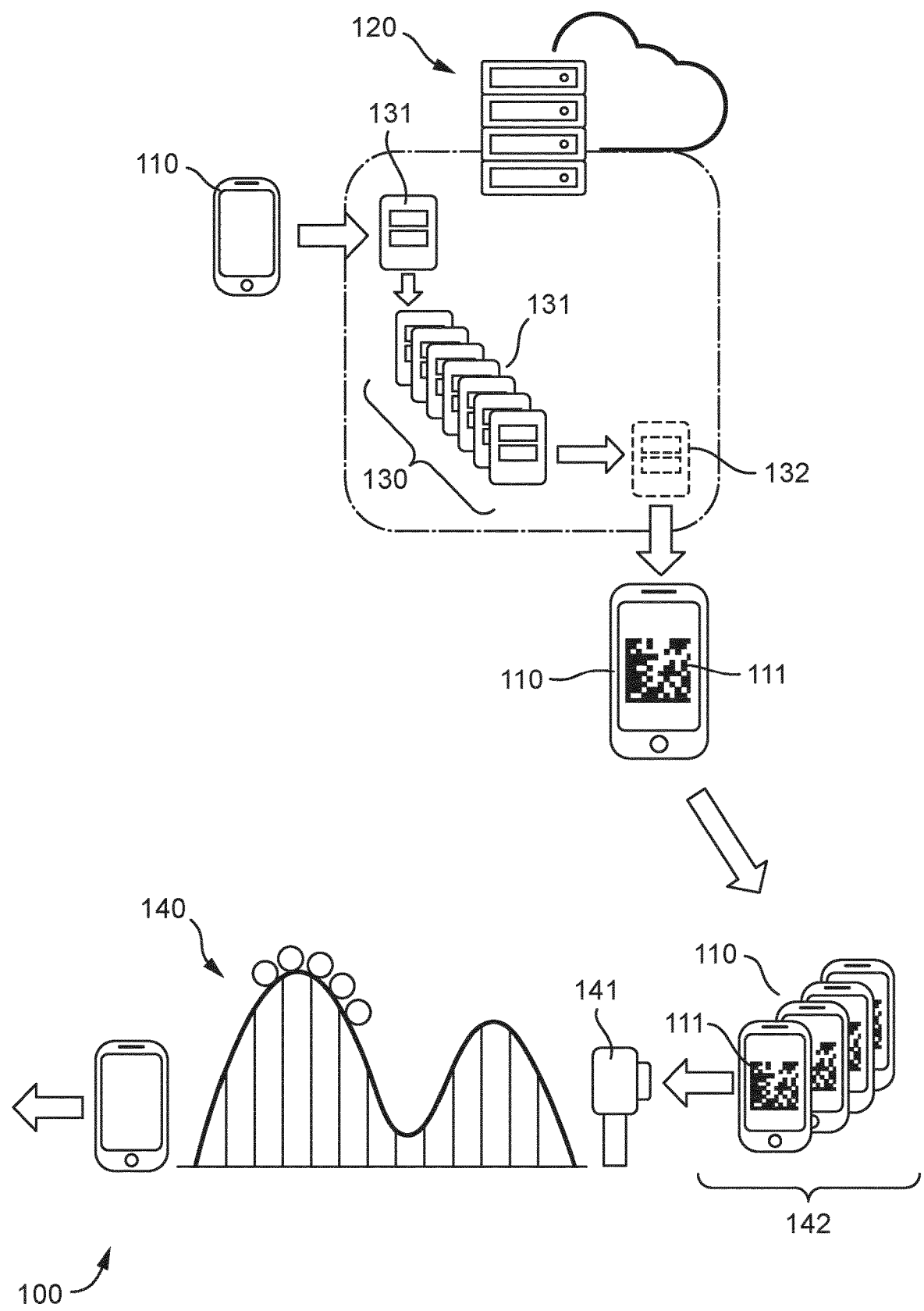
FIG. 1 schematically illustrates a virtual queuing system according to the present invention.

FIG. 1 schematically illustrates a virtual queuing system 100 for managing a virtual queue 130 for a resource 140 according to the present invention. In the examples of the figures, the system is illustrated in the context of a theme park where the resource 140 is an attraction 140, in particular a theme park ride, but the system could equally be applied to any other situation in which queuing for a resource or service is required. The system comprises a plurality of user devices 110 and a virtual queue management unit 120. Each user device 110 is configured to allow a user to join a virtual queue 130 for the attraction 140 by creating a virtual queue entry 131 associated with the user device 110. The virtual queue management unit 120 is configured to maintain a virtual queue 130 comprising a sequence of virtual queue entries 131 and manage the virtual queue 130 by sequentially removing virtual queue entries 131 from the front of the virtual queue 130 and providing the user devices 110 associated with the removed virtual queue entries 132 with an access pass 111 (or, equivalently, an "access key") which allows the user to access the attraction 140.

In this way, rather than a user having to wait in a physical queue to access the resource 140, a user may instead join a virtual queue by using the user device 110 to create a virtual queue entry 131. The user will then be notified when they reach the front of the virtual queue 130 and will be provided with an access pass 111 on their user device 110 which can be used to access the attraction 140. In particular, at the entrance to the attraction 140 there may be an access control unit 141 configured to validate an access pass 111 provided to the user device 110 to allow a user access to the attraction 140.

In order to effectively manage the virtual queue 130, the queue management unit 120 is preferably configured to supply access passes 111 to user devices 110 when necessary to ensure that the attraction's 140 capacity is utilised effectively without generating too long a physical queue 142 at the attraction 140 entrance. Generally, the system 100 is preferably configured to maintain a short "boarding queue" in the form of a physical queue 142, restricted in number, at the boarding area of the attraction 140. This ensures that there is always a supply of users ready to access the attraction 140 and fill the available capacity but allows the number of users gathered together to be regulated to minimise the amount of time that the user must spend in the physical queue 142 and, where necessary, allow social distancing restrictions to be maintained. In practice, this process of accurately managing the virtual queue 130 to supply users at the specific required rate is very difficult to achieve with known systems. The present invention is directed at improvements to this process of managing the virtual queue 130 such that attraction capacity can be optimised while maintaining required social distancing restrictions and keeping physical queue 142 time to a minimum.

The present invention involves using user behaviour data associated with the specific users in or removed from the virtual queue as an input to inform the process of managing the queue 130. This allows the system to better predict the required rate of supply of users to the attraction 140 to address the above identified problems. The process in general involves using one or more different types of user behaviour data to (1) more accurately measure parameters associated with the current operation of the attraction 140 to understand the current use of the attraction 140 capacity and (2) predict the actual supply of users to the attraction resulting from users being removed from the virtual queue 130 and provided with an access pass, such that the queue management process can be adjusted to ensure the required supply of users to the front of the attraction 140.

One important source of user behaviour data is data received from the user device 110. To achieve this, the user device 110 is preferably configured to determine one or more types of user behaviour data relating to the behaviour of the user in possession of the user device 110. This user behaviour data can include for example one or more of location data, movement data, device usage data, for example use of a software programme on the user device 110, purchase history or historical data associated with the user's use of the virtual queuing system 100.

With this in mind, the user device 110 is preferably a smart user device such as a smartphone, tablet or smart wearable device which can determine user behaviour data. The user behaviour data is sent from the user device 110 to the virtual queue management unit 120 and taken into account when determining one or more parameters defining the management of the virtual queue 130. The queue management unit 120 is preferably a central server which is able to communicate remotely with each of the user devices 110. Any type of wireless connectivity may be used to connect the user devices 110 and queue management unit 120 but preferably they are connected via the internet. In particular the user devices 110 may be running software (i.e. an app deployed on a smart device) which connects to the queue management unit 120 to facilitate exchange of data.

Other sources of user behaviour data include data associated with a user's use of a connected system and received directly from such a connected system. In the example of a theme park, this might include data associated with a user's use of, for example, a parking system, hotel booking system, restaurant booking or order system, a vending machine. A further source is profile data relating to a specific user of the system. For example, a user may be required to create a profile to use the system and user data within the profile, such as demographic data, may also be used as an input in managing the virtual queue. The profile may also be associated with historical user data associated with the user's past use of the virtual queuing system and the connected systems which can also be used as an input. These types of additional user data can be used to make predictions about the user's use of the system, as will be described.

Figure 2:
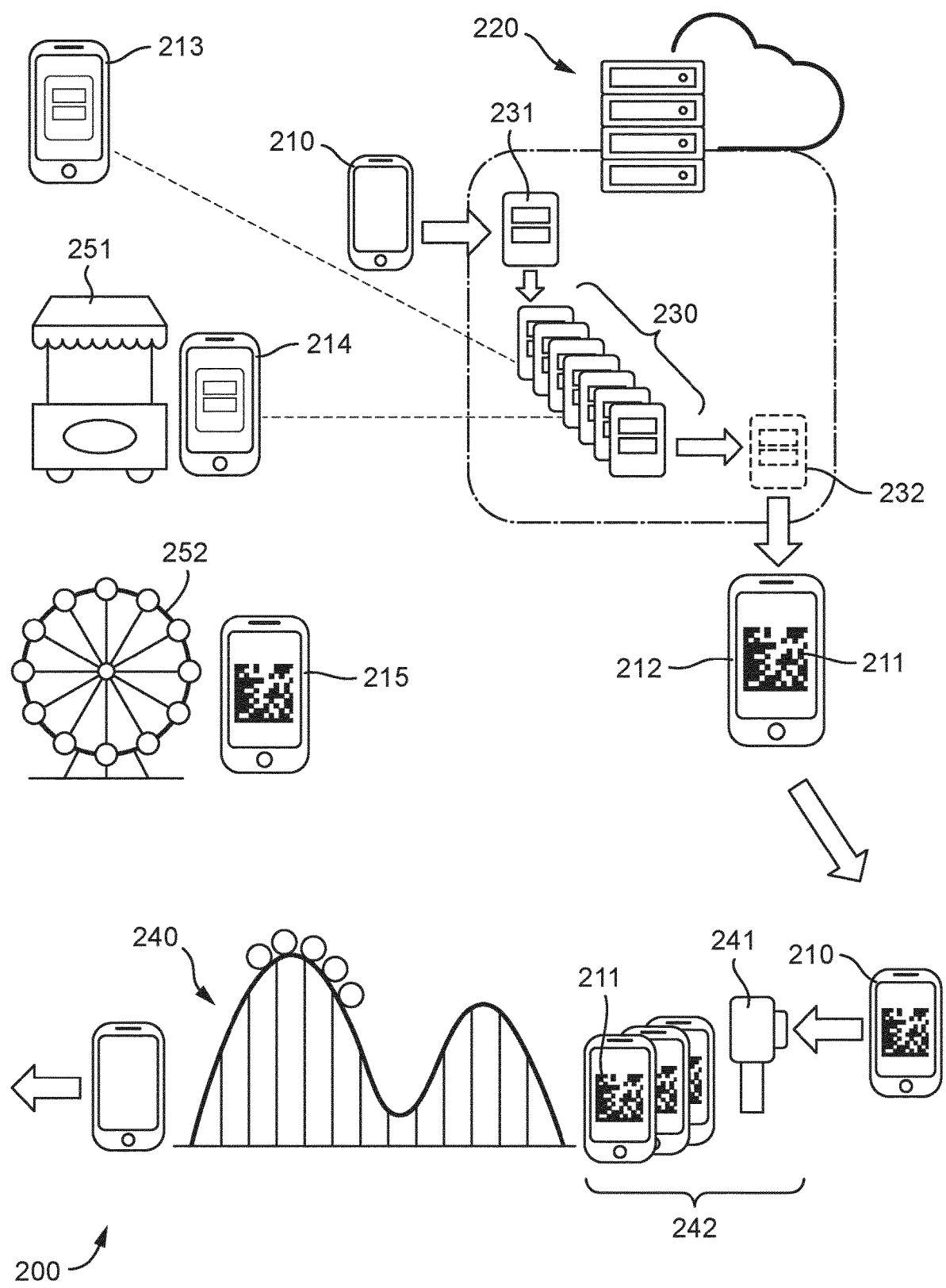
FIG. 2 schematically illustrates a virtual queuing system according to the present invention.

FIG. 2 schematically illustrates a virtual queuing system 200 for managing a virtual queue 230 for one or more attractions 240, for example across a theme park. The system 200 of FIG. 2 is configured such that user behaviour data is used to manage the virtual queue 230 more effectively to ensure that the attraction 240 is neither operating under capacity resulting in users queuing longer than might otherwise be expected in the virtual queue 230, or with too long a physical queue 242 resulting in users having to queue for an increased amount of time in the physical queue 242 which may also have implications for maintaining social distancing.

As described with reference to FIG. 1, the system 200 of FIG. 2 operates by allowing users of the attractions to use a user device 210 to create a virtual queue entry 231 within a virtual queue 230 which is managed by the virtual queue management unit 220, which, as in all examples of the invention, may be provided in a form of a central server, either locally or on the cloud. The virtual queue management unit 220 removes virtual queue entries 231 from the front of the virtual queue 230 when there is capacity to access the attraction 240, with the user devices 212 associated with the entries 232 removed from the front of the queue 230 provided with an access pass 211 which can be used to access the attraction 240.

In this example, an access control unit 241 is provided at the entrance to the boarding area, containing the physical queue 242, which may be used to scan the access passes 211 to allow access to the physical queue 242 and then the attraction 240. The access control unit 241 may be provided in the form of an automated system such as an automated barrier or gate or may be in the form of a device used by an operator at the attraction entrance who scans the passes 211 of users and admits those with valid passes onto the attraction 240. When the virtual queuing system is working optimally a short physical queue 242 is maintained at the attraction entrance so as to fill the capacity of the attraction without the physical queue 242 becoming too long.

In practice this is very difficult to achieve for a number of reasons. The attraction throughput, i.e. the number of users using the attraction per unit time (e.g. per hour), can vary over the day. Each attraction 240 may have nominal maximum throughput giving the target number of users per hour passing through 240 but the actual throughput may vary depending for example on the number of staff working on the attraction, the time of day, disruptions in service, unexpected temporary ride closures or varying numbers of users who have purchased passes to skip the queue or credits to reduce their wait.

This variation in throughput with time effectively means that the capacity of the attraction 240 varies throughout the day making it difficult to de-queue users from the virtual queue 230 at the required rates to meet the changing capacity. In addition to the capacity varying, it is also difficult to ensure a reliable supply of new users to the physical queue 242 to match the capacity. The inventors have determined from their experience implementing virtual queuing systems that a significant issue with known systems is that there is a significant but varying proportion of users in the virtual queue 230 which do not use their passes 211 to board the attraction 240. The difficulty in effectively implementing such systems therefore resides in attempting to match a varying capacity of an attraction 140, 240 with a supply of users that may vary from the nominal supply rate (given by the de-queuing rate). User behaviour data can be used to better predict both the capacity and supply to more optimally achieve this balance.

Use of Location Data

An important type of user behaviour data is location data. By providing the user devices with means for determining their location and sending this location data to the virtual queue management unit 220, both the throughput of the attraction 240 and the estimated supply of users to the attraction 240 can be better predicted. This can be readily achieved in practice by implementing the system with smart user devices as described above which now commonly monitor the location of the user device 210 and can provide location data to software running on the smart user devices 210. In particular, the user devices 210 may be provided with an app or software for use at the attraction will allow them to create the virtual queue entry 231 and also which determines location data and sends this to the virtual queue management unit 220.

A first way in which location data can be used is to estimate the throughput of the attraction 240. Each attraction 240 generally has an optimum maximum throughput giving the number of users that can use the attraction per hour when the attraction is operating optimally. Changes from this optimal maximum throughput must be identified in order to provide the required supply of users. As described above, generally a physical queue 242 is provided at the entrance to the attraction 240. If the access control unit 241 is positioned at the entrance to the attraction 240 (i.e. at the end of the boarding queue 142 as in FIG. 1 rather than at the start of the physical queue 242 as in FIG. 2) to authenticate users as they access the attraction 240, the throughput can be measured accurately by the number of passes 211 that are being authenticated and this data can be sent to the virtual queue management unit 220.

However, in practice there are practical difficulties with providing the authentication at the end of the boarding queue rather than at the front of the boarding queue as shown in FIG. 2. This is because in this situation users may queue in the physical boarding queue 142 242 for some time, reach the front and discover that they do not have a valid pass 211 and therefore cannot access the attraction 240. Similarly if their device 210 loses battery or otherwise malfunctions during the time spent in the boarding queue they may not be able to access the resource 240.

For this reason it is preferable to provide an access control device 241 at the entrance to the boarding area to scan access passes 211 on user devices 210 as the users join the physical queue 242. The downside of the latter arrangement is that the information on throughput is much less accurate because changes in the number of users leaving the physical queue and accessing the attraction are not registered by the access control device 241. In this situation the boarding queue 242 can increase in size leading to the problems identified above.

Using multiple access control devices 241, for example devices that both the beginning of the boarding queue 242 and at the end at the attraction 240 entrance would provide an optimal solution as this allows accurate monitoring of both the throughput and the number of users in the physical queue 242. However, this would result in a significant increase in costs due to requiring multiple members of staff verifying users or installation of multiple automated access barriers.

The use of location data can provide a low cost solution to this problem by configuring the user devices 210 to send location data to the virtual queue management unit 220 for user devices 210 associated with virtual queue entries 232 that have left the virtual queue 230. By monitoring the location of these user devices 210 and observing as they pass through the locations associated with the attraction 240, an accurate real-time measure of the throughput of the attraction 240 is available to the virtual queue management unit 220. The de-queuing rate can therefore be adjusted so as to match the varying throughput of the attraction 240.

In addition to measuring throughput, a second way location data can be used is to estimate the actual supply of new users to the boarding queue 242. As described above, the inventors have determined that, in practice, a significant and varying percentage of the users associated with the virtual queue entries 231 in the virtual queue 230 will not validate their access pass 211 at the access control unit 241 to gain access to the attraction 240. Location data can be used in a number of ways to address this problem.

Firstly, if a user device 213 associated with a virtual queue entry 231 that is at an advanced position within the virtual queue 230 sends location data indicating that the user device 213 is beyond a predetermined distance from the attraction 240 entrance, the virtual queue management unit 220 can determine that the user will likely not validate their access pass 211 to access the attraction 240 and increase the number of virtual queue entries which are de-queued accordingly. Similarly, if a user device 213 within the virtual queue is moving in a direction away from the entrance to the attraction 240 as it progresses towards the front of the virtual queue 230, or as or after it is removed from the front of the virtual queue 230, the virtual queue unit 220 can forecast that an increased de-queueing rate is required given that users are not likely to arrive at the entrance to the attraction 240 to use the attraction 240.

In some examples, a geofence may be implemented to determine when users have left the site (for example the theme park) and therefore will not access the attraction 240. When the location data received from a user device 213 indicates that the user is outside of a defined perimeter the queue management unit may record that the user has left the site and will therefore not use any of their virtual queue entries. This is particularly useful towards the end of the opening hours as the no-show rate rises due to increasing numbers of users leaving the site and allows the system to better predict the supply of users to the attraction to prevent significant under utilisation of capacity.

More generally, over time by collecting location data associated with user devices 210 where a user does not use their access pass 211, a model can be built to determine the likelihood that a user will attend the attraction 240. For example, a machine learning model can be trained using historical data including location data of users that authenticated their access pass 211 and those that did not authenticate their access pass 211. By training a regression or classifier model to predict "no-shows" on the basis of their preceding location data (in a selected time period covering time that they are in the virtual queue 230 and/or the time after they are provided with their access pass 211) the trained model can then be used in real time to predict a proportion of de-queued virtual queue entries 231 which will not be authenticated by the access control device 241.

It should be noted that location data may only be required for a proportion of the virtual queue entries 231 in order to input into the trained predictive model to calculate the adjustment factor, rather than requiring the behaviour data from all virtual queue entries 231, which can reduce the computational requirement. This general point applies to all embodiments of the invention. For example, if location data is only available for a certain percentage of user devices 210, the system 200 can still make predictions of the throughput, boarding area population and no-show rate using this incomplete location data and still provides significantly improved matching of throughput and user supply over known systems.

Location data can also be used to identify the number of user devices 210 in the physical queue within the boarding area 242 and adjust the number of users that are de-queued accordingly. For example, where there has been a prolonged period at which the attraction 240 has been operating below the maximum optimum throughput, the number of users in the boarding queue 242 may have started to increase. In arrangements where the access control units 241 are positioned at the front of the boarding queue 242 (directly at the entrance to the attraction 240) it is not possible to use data from the access control unit 241 to determine the number of users in the boarding queue 242. Therefore, in this scenario a number of users congregating in the boarding area 242 could increase to a level in which users have to physically queue for a long period of time and are confined to the boarding area. By using location data received from user devices 210 corresponding to virtual queue entries 232 which have been removed from the virtual queue, the number of users that are present in a location corresponding to the boarding area 242 can be determined. The number of users removed from the virtual queue 230 can therefore be adjusted to reduce the number of users providing access passes 211 to enter the attraction 240.

Use of User Device Usage Data

Other types of user behaviour data beyond location data can also be sent to the virtual queue management unit 220 in order to adjust the management of the virtual queue 230 to more accurately meet the current throughput. For example, the activity undertaken on a user device 210 while that user device 210 has a virtual queue entry 231 in the virtual queue 230 is, in certain circumstances, indicative of whether or not the user is likely to use their access control pass 211 and use the resource 240. Usage data related to user devices 210 may therefore also be used in calculating an adjustment factor to be applied when removing users from the virtual queue 230.

As shown in FIG. 2, a user device 214 corresponding to a virtual queue entry 231 within the virtual queue 230, is being used to make a purchase at a food stall or restaurant 251. This may be indicative that the user is unlikely to use that access pass 211 when they reach the front of the virtual queue 230 to access the attraction 240. User device 215 is being used to access a second attraction 252, again likely indicating that they are unlikely to use the access pass 211 generated for the first attraction 240. Other examples of device usage data include data associated with usage of the device 210 to make a reservation for a restaurant or to check into a hotel or any other type of usage which may have a correlation with a likelihood of not using the access pass 211 to access the attraction 240. This usage data may be sent from the user devices 210 or directly from connected systems within the park, such as the payment or booking system at the restaurant 251.

As described above with respect to the location data, a historical data set including usage data of user devices 210 within the virtual queue 230 (or user devices 212 having left the virtual queue 230 after being provided with an access pass 211), together with data on whether the access pass 211 was or wasn't used to access the resource 240, can be used to build a predictive model to estimate an adjustment factor. The user device 210 is preferably a smart user device which is capable of monitoring a large amount of usage data which could inform the queue management process.

In preferable implementations, the user device 210 is provided with software, for example in the form of an application ("app") which can be used for both joining virtual queues 230 (by creating virtual queue entries 231) and performing other activities such as making purchases and reservations. In the illustrated example of the application of the system to a theme park, users preferably download an app which covers various aspects of their interaction with the multiple attractions 240, 252 and services provided at a theme park. For example the app may allow them to monitor wait times for each of the attractions 240, 252 to join virtual queues 230 of one or more attractions 240, 252, to make reservations in the restaurants 251, navigate the park, add events to a planner, view a calendar, check into hotels and make purchases at the theme park. In this way, the application has access to a wide range of user behaviour data to optimise the queue management process performed by the queue management unit 220.

Connected Device Usage Data and User Profile Data

Other types of user behaviour data may be used alternatively or in addition to those identified above. Firstly, the queue management unit 220 may be configured to receive data from other systems, external to the virtual queuing system 200. In many cases, a user's interaction with other systems may also be indicative of their future behaviour and likelihood of using their access pass 211. For example, if the user has just used the parking system to retrieve their car, this is likely indicative that they do not intend to use their pending virtual queue entries. This is also the case for a wide range of other systems, such as the payment and booking systems of other resources which may indicate conflicting use of a separate system which precludes their ability to use their access pass. User behaviour data therefore encompasses usage data received from other devices and systems with which the queue management unit is in communication.

More broadly, the queue management unit can be configured to receive other types of user data which may be indicative of future behaviour and interaction with the resource 240. Firstly, demographic data associated with the user may be predictive of their future use of a resource. For example, certain age group ranges may be less likely to honour a virtual queue reservation than others. The system may be configured to continue to build a user profile using collected data relating to their use of the system 200 to increase the accuracy with which the system can predict future interaction with the resource. A primary contribution of the present invention is that, rather than always following the same queue management protocol as in prior known systems, the queue management unit 220 of the present invention is configured to adapt its management depending on specific information related to the virtual queue entries to provide improved performance.

Selection of Virtual Queue Entries Based on User Behaviour Data

The examples of FIG. 2 each use user behaviour data to adjust a number of users de-queued at a certain time or the de-queueing rate of the virtual queue 230 to best utilise the throughput of the attraction. A further or alternative use of behavioural data is illustrated in the virtual queueing system 300 of FIG. 3. In this example, either instead of or in addition to varying the de-queuing rate, the queue management unit 320 is configured to change the selection of virtual queue entries 331 within the virtual queue 330 to be provided with an access pass. The virtual queue management unit 320 is configured to occasionally depart from its standard operating procedure of removing virtual queue entries 331 from the front of the virtual queue 330 to select virtual queue entries within the virtual queue—where this would provide for more effective queue management.

Figure 3:
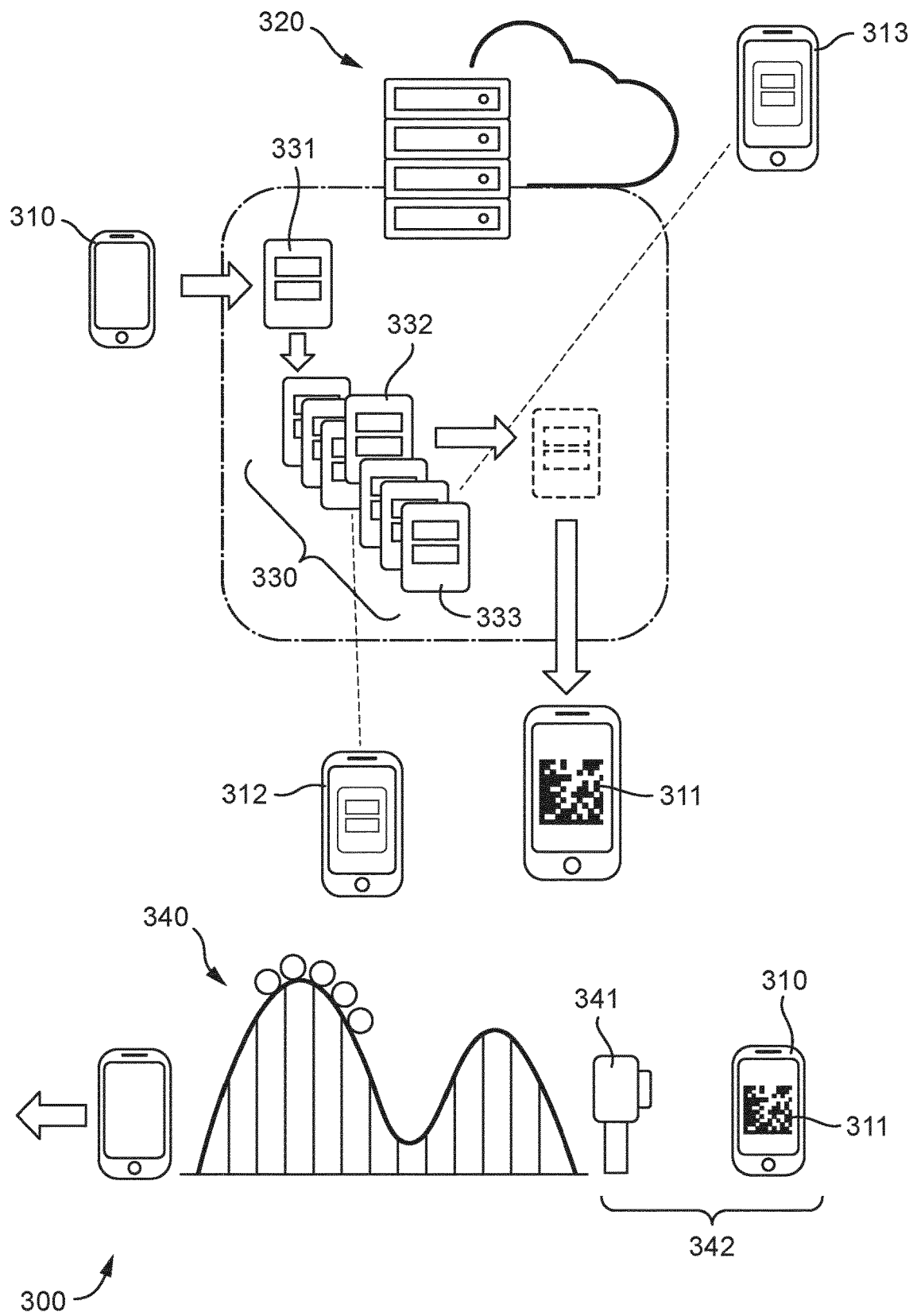
FIG. 3 schematically illustrates a virtual queuing system according to the present invention.

In the example of FIG. 3, location data is received from the user devices 312, 313 associated with virtual queue entries 333, 332 within the virtual queue 330. In this case the queue management unit 320 determines that the user device 313 associated with the virtual queue entry 333 at the front of the virtual queue 330 is positioned a long way from the attraction 340, whereas a user device 312 associated with a virtual queue entry 332 further back in the virtual queue 330 is located close the boarding area 342. In this case, the queue management unit 320 may be configured to select virtual queue entry 332 for removal from the virtual queue 330 ahead of virtual queue entry 333 and provide the user device 312 with an access pass 311 ahead of the user device 313 associated with the virtual queue entry 333 at the front of the virtual queue 330.

In this way the virtual queue management unit 320 may take into account the location data in making selection of a virtual queue entry 331 to be removed from the virtual queue 330, departing from its standard operating procedure in which virtual queue entries 331 are sequentially removed from the front of the virtual queue 330. Clearly such a process must only be applied to a limited extent to ensure fair access to the resource 340. However in certain situations this can aid the overall management of the virtual queue 330 and reduce waiting times. One possible example is illustrated in FIG. 3.

Here, the virtual queue management unit 320 may select virtual queue entries 311 which are not at the front of the virtual queue 330, based on received behavioural data, when it is determined that the number of users in the physical queue 342 within the boarding area drops below a threshold. In particular, after a period of sustained high throughput of the attraction 340, or where an unpredicted high number of users have not used their generated access pass 311 to gain access to the resource 340, the boarding queue 342 may be depleted to a level where the capacity of the attraction 340 is not being utilised and users in the virtual queue 330 might need to wait longer than should be required by the capacity of the attraction 340.

As described above, there are a number of possible methods of determining the number of uses in the physical queue 342 within the boarding area, depending on the configuration of the one or more access control units 341. The optimum configuration uses an access control unit 341 at the entrance to the boarding area and an access control unit 341 at the end of the physical queue 342 to scan the access pass 311 as a user enters the attraction. In this case the queue management unit 320 has an accurate real-time measure of the number of users in the physical queue 342 within the boarding area but the increased costs of running this configuration mean it may not be feasible. In a second configuration an access control unit may be positioned at the entrance to the boarding area to scan access passes 311 as a user enters the physical queue 342. In this case the number of users in the physical queue 342 may be determined using the number of access passes 311 scanned using the access control unit 341 and a measure of the throughput of the attraction 340. In a third configuration the access control unit 341 is positioned at the entrance to the attraction itself as illustrated in FIG. 3 In this case, location data may be used to determine the number of users in the physical queue 342 within the boarding area. In any of these configurations, the measure of the number of users within the physical queue can be improved by using location data to determine the number of users who have left the virtual queue 330 and are moving towards the boarding area to join the physical queue 342.

In the example of FIG. 3, the queue management unit 320 uses location data to bring in additional users to the boarding queue 342 by removing virtual queue entries 331 associated with user devices 310 close to the boarding area and providing them with access passes 311. For example, the queue management unit 320 may select the closest required number of users in the virtual queue 330 to provide them with their access passes 311 to increase the numbers in the physical queue within the boarding area to ensure capacity of the attraction 340 is optimised. Alternatively, a predetermined distance around the attraction 340 may be used with all user devices 310 within the virtual queue 330 and within this perimeter of the attraction 340 are provided with an access pass 311 in order to be able to join the boarding queue 342 and access the attraction 340. This provides an additional benefit of providing passes to those users waiting near the attraction entrance in anticipation of receiving their pass, reducing congregating of users in the area around the attraction.

Although in the example of FIG. 3 location data is used to determine when to select a virtual queue entry 332 further back in the virtual queue 330 over the virtual queue entry 333 at the front of the virtual queue 330 to be provided with an access pass, equally other behavioural data may be used. For example, where one or more virtual queue entries 333 at the front of the virtual queue 330 are associated with user devices 310 being used to make a purchase or reservation or other activity indicative that they will not use the access pass 311, or when their profile data suggests they are unlikely to use the resource 340, the users associated with the next virtual queue entries 331 in the virtual queue 330 that are available to access the resource 340 may be removed and provided with the access pass 311.

In some examples of the invention, the selected users may be given a choice as to whether they wish to receive their access pass to access the attraction 340 immediately, or wait until they reach the front of the virtual queue 330. Although in many cases, appropriate users can be selected based on behavioural data alone (such as those congregating around the attraction and so having location data within a radius), in other examples the user may be asked whether they wish to obtain their access pass 311 early. In this case a message may be used to a number of users within the virtual queue 330 that meet the predetermined criteria determined by the behavioural data received from their user devices 310. The message will give the user the option of receiving their access pass 311 immediately or to simply retain their position in the virtual queue 330. Past behavioural data may be used in order to predict the number of users that accept an early access pass 311 in order to determine the number of user devices within the queue 330 to which messages are sent.

In these examples, the virtual queue entries 333 at the front of the virtual queue 330 may be maintained in the virtual queue 330 and until a point in which the behavioural data suggests they are ready to access the resource 340. In some examples they may only be maintained in the virtual queue 330 for a predetermined time period after which, if behavioural data suggests they are still unavailable to access the resource 340 they may be removed from the virtual queue 330 and users would need to re-join by creating a new virtual queue entry 331 at the back of virtual queue 330.

Use of Behavioural Data to Set an Active Time of an Access Pass

In the above described examples of the invention the access pass 111, 211, 311 may only be valid for a set time period in which the pass may be used to access the resource 140, 240, 340. The set time in which the access pass 111, 211, 311 is valid is preferably selected to provide the user with sufficient time to travel to and access the resource 140, 240, 340 but not so long that it would reduce the accuracy with which the supply of users to the resource 140, 240, 340 can be controlled.

For example, if an access pass 111, 211, 311 is valid for an hour the user could arrive and access the attraction 140, 240, 340 at any time within that hour meaning that it is difficult to predict the rate in which users will arrive at the attraction 140, 240, 340 which could result in the boarding queue 142, 242, 342 being depleted such that the attraction 140, 240, 340 capacity is not efficiently utilised or it could result in the boarding queue 142, 242, 342 becoming too long, increasing waiting times and restricting the operators ability to maintain social distancing between users.

The set time in which the access passes 111, 211, 311 are active may be determined depending on the specific attraction 140, 240, 340, for example its accessibility within a theme park, its throughput and the length of boarding queue 142, 242, 342. In arrangements in which the access control device 141, 241, 341 is provided at the entrance to the attraction 140, 240, 340, at the end of the boarding queue 142, 242, 342, the access passes 111, 211, 311 must be active for at least the time it takes to wait in the physical boarding queue 142, 242, 342 before it can be scanned by the access control unit 141, 241, 341. Therefore, the time in which the access pass 111, 211, 311 needs to be active may depend in part on the current length of the boarding queue 142, 242, 342. As described above, location data received from user devices 110, 210, 310 associated with virtual queue entries 131, 231, 331 which have been removed from the virtual queue 130, 230, 330 upon reaching the front and provided with an access pass 111, 211, 311 may be used to determine the real time size of the boarding queue 142, 242, 342. In this case, the virtual queue management unit 120, 220, 320 may be configured to adjust the set time in which the access passes 111, 211, 311 are valid depending on the number of people in the boarding queue 342, as determined by location data.

Specific Examples of System Implementation Features

The above sets out an overview of the queue management system according to the present invention, illustrated in the exemplary context of a theme park having one or more attractions. The system may be implemented in a wide range of ways, within the scope of the claims. The following sets out some possible specific implementations details.

As described above the system comprises a plurality of user devices, each associated with one or more users, and a queue management unit, where the user devices and queue management unit are configured to communicate to send and receive data. The queue management unit is preferably provided on a server with which the user devices can communicate, for example it may be hosted locally or more likely remotely with the user devices and the queue management unit both connected to the internet to facilitate the exchange of data. In some examples, the invention may be implemented using a peer-to-peer (P2P) framework, in which the queue management unit is provided by one or more of the user devices themselves.

The user devices in this specific example are provided by software running on a user's smart device, for example a smartphone, tablet or smart wearable device. The software is preferably in the form of an app which can be downloaded by the user and run on their smart device such that users can access all functionality associated with the one or more resources through the app. In other examples, users may be provided with a dedicated user device on arrival at the one or more attractions. The system of the present invention is particularly well suited to theme parks and other such sites within which there are multiple resources or services such as attractions, rides, and shows that can be accessed by the users, and the following example is described in the context of a theme park.

In this preferable example, the access passes provided to the user devices are delivered to the app and revealed once the user reaches the front of the virtual queue. The access pass is preferably an electronic key which is generated and may be authenticated to allow access. The access pass may be in the form of a barcode. Preferably the access pass may be scanned and authenticated without an internet connection to allow access even if the network is temporarily unavailable. The access pass may be a JSON Web Token, including all the necessary details in a small JSON payload along with a digital signature confirming its identity.

The access passes are authenticated at the attraction to provide access to the user. In particular the passes are scanned with an access control device. The access control device may be a handheld unit used by an operator to scan and confirm the validity of the pass. In this case the access control device may be a user device running software with functionality to scan and validate the passes. Alternatively, the access control unit may be an automated barrier comprising a scanner arranged to scan an access pass displayed on a user device and a barrier which is opened upon the pass being validated. Where the access control device is operated by an operator, the system may be configured such that the operator can manually admit a user into the physical queue or onto the resource, even if they do not have a valid access pass, for example if they have a third party pass or otherwise are allowed access to the resource but do not have a valid pass. The access control device can be configured to register that access is granted to such a user so that an accurate value of wait times, throughput and boarding queue numbers can be maintained.

In order to ensure that capacity of the attraction is utilised it is usually necessary to maintain a physical queue (in a "boarding area") at the entrance to the attraction to ensure a supply of users to the attraction. The access control device may be positioned at the entrance to the boarding area and/or at the end of the boarding area.

The access pass is configured to remain active for a set time period before it expires. The set time is restricted to ensure that the users access the attraction shortly after they have reached the front of the virtual queue so that supply of users to the attraction is controlled (given that it can be determined relatively accurately when a user will arrive at the boarding area). The set time period may be set for each attraction, taking into account for example the location of the attraction and the length of the boarding queue. In some examples, as described above, the length of the set time may be varied to account for changes in the population of the boarding area.

Queue Reservations

The software running on the user device provides users with various functionality to interact with the attractions and services at the theme park. The software has a function to allow a user to reserve a place in one or more virtual queues for the various attractions. When a user selects an attraction and reserves their place in the queue, the user device communicates with the virtual queue management unit and a virtual queue entry is created. The virtual queue entry of this example includes:

The number of people in the group;
The initial timestamp giving the time the reservation was created;
A priority timestamp representing the "priority time", which is usually the same as the timestamp when the reservation was created but could vary as described below;
An ETA timestamp representing the estimated time the user will reach the front of the queue and be provided with their access pass
The current status of the reservation: an enum which represents where in the journey the virtual queue entry is. For example, the current status enum can indicate (1) the virtual queue entry is in the virtual queue, (2) the user has been sent to the attraction boarding area, (3) the user is in the boarding area for the attraction, (4) the user has passed through the boarding area and gained access to the attraction, (5) the user has left the attraction and the reservation is complete.

The virtual queue entry is created on the virtual queue management unit. The information may then be sent to the user device, where the ETA timestamp is used to provide the user with an indication of the remaining wait time.

De-Queueing Users from the Virtual Queue

The queue management unit maintains a virtual queue comprising virtual queue entries ordered by their priority timestamp. The queue management unit manages the queue by de-queueing users, i.e. removing users (in most instances) at the front of the queue and providing these users with an access pass that can be validated at the attraction to allow the user access.

The system may run an "event-based" system or a "rate-based" system. In an event based system, one or more users are de-queued in response to an event, for example a user leaving the physical queue to enter the attraction, as determined by data collected from the access control devices for example. Each time such an event is detected, the queue management system de-queues one or more users. An event-based system still results in a varying of the de-queueing rate but it is not set directly as an input parameter.

In the rate based system, the system attempts to de-queue users at a rate such that the capacity of the attraction (e.g. a theme park ride) is saturated, while minimising the time at which users have to wait in the physical boarding queue. The de-queueing rate R is primarily based on the throughput of the resource T. In some examples, the de-queueing rate R can simply be set equal to the throughput T.

The system can function using a nominal constant throughput T, which remains constant and is used to determine the de-queueing rate. In this case, users are removed from the virtual queue at a constant rate R=T. However, drops in throughput will then result in the physical queue at the attraction growing, making it difficult to maintain social distancing requirements and leading to undesirable wait times.

Therefore the system preferably uses a variable throughput. The variable throughput may comprise a throughput $T(t)$ which varies with time based on known changes throughout the day or in response to known events such as rides operating at lower capacity due to maintenance. Alternatively the throughput T may be directly measured to provide a more accurate current throughput.

As described above, a direct measure of throughput may be determined by an access control unit 141 positioned at the entrance to a ride, as shown in FIG. 1, which can record the number of passes that are scanned and therefore provide a real time measurement of the rate at which users are accessing the ride. However, there are disadvantages with positioning an access control unit solely at the entrance to the ride as it means that users could queue in the physical queue and then find when they reach the access control unit that their pass is not valid or their user device has run out of battery. Positioning the access control device at the entrance to the boarding area solves these issues but means that throughput cannot be directly measured. Therefore the system of the present invention may be configured to use location data of the user devices, as described above, to monitor real time throughput of the attractions and use this to determine the de-queueing rate.

The de-queueing rate may therefore be set at this constant, varying or live throughput value and used to remove virtual queue entries at this rate and provide them with access passes to access the ride.

A particularly advantageous implementation of the event-based system, involves setting a target physical queue population for a particular attraction (to balance optimising capacity with restricting physical queue time), measuring the boarding area population (i.e. the number of users in the physical queue) and de-queuing users in response to the measured physical queue population dropping below the target number. Here, virtual queue entries are removed in response to changes in the determined boarding area population. When the boarding area population is predicted based on the attraction throughput, this method is effectively as described above and the de-queueing rate will vary with the throughput. Where a direct measure of the boarding area population is available (e.g. from the use of access control units positioned at the entrance to the boarding area and the entrance to the resource or from location data) the de-queuing rate can be varied in response to the measured boarding area population (i.e. the number of users in the physical queue) to maintain the target number of users in the physical queue.

Using the boarding area population area number as the input to control the de-queuing rate provides a robust way to ensure capacity on the attraction is always saturated, whilst restricting the number of users in the physical queue to a chosen limit. The target physical queue size can be selected for each resource, for example based on one or more of: throughput, size of physical queueing area, capacity of the resource.

Adjusting the De-Queuing Rate to Compensate for Abandoned Reservations

A notable issue with virtual queuing systems is that, since the time investment required in physical queues is removed, there is no penalty for not turning up at the attraction when the access pass is issued. The observed result is that there is a significant "no-show rate" which fluctuates considerably. This means that, even if the de-queueing rate is matched to an accurate measure of the current throughput, the amount of users arriving at the attraction will be less than that required to saturate the attraction capacity by a varying amount.

To address this issue, examples of the present invention implement an adjustment factor A which is applied to the throughput in the case of the rate-based system, or the number of users de-queued in the event-based system. In the rate-based system, the adjustment factor A is applied to the throughput T to calculate the de-queueing rate R:

$$R = T \times A$$

The adjustment factor could simply be a fixed constant, which could be adjusted by the user of the operator of the system to lift the de-queueing rate above the throughput of the resource to compensate for users not using their access pass to enter the attraction. However, a number of more sophisticated methods have been determined which provide improved results.

The system cannot know the precise current value of the proportion of users who will not use their access pass to access the attraction. This is because the system is only aware after the set time in which the pass is active has expired. However the system has data on the no-show rate (the "loss factor") up to a past point in time corresponding to the current time minus the set time period. This data can be used in a number of ways.

It has been determined that on average the loss factor variation displays a similar behaviour over the course of the opening hours of a theme park. Therefore, a variable adjustment factor which is dependent on time of day A(t) can be used which compensates the variation behaviour of the loss factor over the course of park opening hours. This would help with compensating for the average changes in loss factor over the day but would not compensate for unusual or periodic events which might impact the loss factor. An alternative is therefore to use the loss factor recorded in an immediately preceding time period to predict the current or future loss factor. In more detail, when users with access passes do not use their pass to access the resource this is recorded by the virtual queue management unit. The queue management unit can then use this data to make a prediction about the current or future loss factor. The preceding time period could be, for example, the preceding hour (before the point corresponding to the set period back from the current time) or up to the full time the attraction has been open that day.

It has been determined that simple linear regression models work well, particularly using a short time period preceding the current time, such as an hour. More complex models, such as quadratic or more complex polynomial regressions work well for longer periods of time. In this way, the queue management unit can calculate a predicted loss factor L and use this to determine the adjustment factor A as follows $$A = \frac{1}{1-L}$$

For example if the queue management system determines that the predicted current loss factor is 0.2 so 20% of people in the virtual queue will not use their access pass, for an attraction having a nominal maximum throughput T of 600 users per hour, the de-queueing rate R=T×A=750 users per hour.

In some cases, a more accurate estimate of the current or future loss factor may be determined by taking into account known events to predict the loss factor and therefore the adjustment factor used to determine the de-queueing rate. For example, in a theme park setting, one metric might be to compare the number of users in a virtual queue who turn up to access the ride, against the number of users in that queue who were known to leave the theme park. Even if not all users trigger a theme park-exit event, there can be a strong enough correlation comparing the number of exit events received by users in a queue, to the number of users who do not turn up. A regression analysis, as above, can be used to determine this relationship, producing a formula which can give an estimation of the number of users who will not turn up by providing the number of exit events from users in the virtual queue (or users who will be de-queued within a certain timeframe). With the expected number of users who will not turn up, N, this can be converted into the loss factor L (proportion of users who will not turn up) by taking the ride's throughput, T, (over the same timeframe as the estimated number of users who don't turn up) into account:

$$L = (N/T)$$

Aside from exit events, other events can be used to help determine users who will not use their access pass by using user behaviour data sent from the user devices. This user behaviour can include:

Location data, for example the proximity of the users to the attraction and/or their moving direction If the app has been used to make a reservation or order food at a time which conflicts with reaching the end of the virtual queue If the user has checked into a hotel, signalling that they do not intend to use their access pass If a notification or alert has recently been received through the app Since the user device software has access to a wide range of user behaviour data such as this, it is possible to use historical data (including user behaviour data labelled as to whether or not they used their access pass) to train a machine learning model to predict whether users within the virtual queue will use their reservation. In particular, as—or after—a user creates a virtual queue entry, their smart device can send the queue management unit behaviour data, including location data and app usage data. This behavioural data can be input into the trained machine learning model to provide a prediction of the likelihood that the user will use their access pass to access the attraction.

Behavioural data can be sent periodically during the time the user spends in the virtual queue and the prediction can be updated by inputting the further behavioural data into the trained model. The prediction can be used to determine the predicted loss factor at the current or future time for the virtual queue. In particular, data from all users can be used to provide the estimate or a sample of users can be used to make a prediction for the loss factor of the virtual queue. The loss factor can be used to calculate the adjustment factor which is multiplied by the ride throughput to determine the de-queueing rate.

Although the adjustment factor has been illustrated in the case of the rate-based system it may equally be applied as described above to the event-based system, where the adjustment factor is applied each time a number of users are de-queued in response to the particular event. For example, when virtual queue entries are only removed when it is determined that the physical queue has reduced below the target number, effectively a "one-in one-out" system, an adjustment factor may be applied to remove more than the needed number of users from the virtual queue to achieve the target population number to account for users who will not use their access pass to access the resource. All of the methods described herein for determining the adjustment factor may be applied to this "event-based" configuration in which a number of users (possibly adjusted to account for no-shows) are called only in direct response to the number of users in the physical queue reducing.

In this way, the system makes significant progress in addressing the problem of matching supply of users to throughput, despite a fluctuating proportion of users in the virtual queue who will not access the attraction. The accuracy of matching user supply to throughput can be improved still further by combining these methods of calculating an adjustment factor with the methods described above for determining a more accurate measure of the current throughput of the attraction.

Possible Additional System Features

The system according to the present invention, such as any of those illustrated in the figures, may have a number of possible further features which may be implemented individually or in combination.

The user device may be configured to display queue times for one or more attractions. In particular, data on the one or more virtual queues managed by the queue management unit may be sent to the user devices to display information on the attractions such as current wait times. The queue time for an attraction is calculated by dividing the number of virtual queue entries by the de-queueing rate R. The de-queueing rate may simply be the throughput value for the attraction or, more preferably, may be calculated using one of the methods described above. In some implementations, a buffer may be applied to provide a predicted wait time slightly above that predicted by the number of virtual queue entries divided by the current de-queueing rate. For example the calculated wait time may be multiplied by a buffer factor, e.g. 1.15, to increase the stated wait time to compensate for any temporary ride closures or unexpectedly slow throughput.

The wait times for the attractions are preferably made available to the user devices through live data. In particular the wait times are preferably calculated on the queue management unit and pulled to the user devices when requested, for example when the app running on the user devices is refreshed.

When the user has joined a virtual queue, the user device displays the wait time (the ETA timestamp, part of the virtual queue entry described above) stored on the queue management device, which is calculated based on the de-queueing rate and the number of virtual queue entries ahead in the virtual queue. When the user device requests an update, such as when the app is refreshed, the queue management unit may be configured to determine whether an updated wait time should be sent to the user device. In some examples this process can operate as follows.

When the user checks the wait time (i.e. when the software on the user device is refreshed) a minimum and maximum ETA are calculated by dividing the number of users ahead by the de-queueing rate and multiplying by a different buffer percentage. The minimum ETA has a buffer percentage of zero, the maximum ETA has a buffer percentage of (for example) 30%. To avoid rapid updating of the ETA as the user reaches the front of the virtual queue a constant may be subtracted from the minimum ETA and added to the maximum ETA, for example 3 minutes.

The current ETA stored in the virtual queue entry on the queue management unit is compared to the calculated maximum and minimum ETA (which may be calculated at the user device or the queue management unit). If the currently stored ETA timestamp falls outside of this rage, the ETA timestamp is reset to the middle of the range. The new ETA timestamp is written to the virtual queue entry and returned to the user device.

The system is preferably applied to sites with multiple attractions. In most cases it is preferable to restrict the number of attractions that a user can simultaneously queue for to avoid queueing times becoming too long. However the availability of queueing data across the attractions may be used to allow users to queue for multiple attractions where possible. For example, a user may use the user device to join a first virtual queue for a large attraction with a significant queue time. Meanwhile one or more other attractions may have a much shorter wait time. In this case the user device may provide a list of available attractions that the user may join a virtual queue for. The queue management unit may determine the list of available attractions based on for example the size of the virtual queue or the current population of the boarding area of those attractions.

As described above, a user's position in the queue is determined by the priority timestamp in the virtual queue entry, which is by default the time in which the virtual entry was created. In this way, users queue in the order in which they join the queue as with a physical queue. However, the virtual queue system may be configured to adjust the priority time for a number of reasons. For example, if a user has been queuing in a virtual queue for an attraction which then breaks down, they may be provided with credit in terms of wait time which is then subtracted from their priority time when they join a new virtual queue. In this way, their priority timestamp is earlier than their initial timestamp in which they joined the virtual queue, which effectively moves the corresponding virtual queue entry forward within the virtual queue (assuming there are virtual queue entries in the virtual queue with a priority timestamp ahead by a time period less than the credited time).

For example, the priority time stamp in the new virtual queue may be set to the same time as the priority timestamp of the virtual queue in which the attraction broke down, so that the user's wait time is credited to the new queue. In some examples of the invention, the virtual queueing system may be configured such that a user can buy credits corresponding to time which can be subtracted from their priority timestamp in one or more virtual queues. The user may be able to decide how to distribute this wait time credit across virtual queues that they join.

As described above, in some examples the queue management unit is configured for use with a physical queue for the resource where the access pass generated allows a user to join the physical queue at an advanced position or it may allow a user to bypass the main physical queue completely. All features described herein function in exactly the same way with this set up and behaviour data may be used to manage the virtual queue where it allows a user to join at an advanced position or the front of the physical queue and therefore may be usable as a "premium" option. In particular, user behaviour data received from users in the virtual queue may be received by the virtual queue management unit and used to inform how the virtual queue is managed. In addition, in these examples, user behaviour data associated with users in the physical queue (in portions ahead of and/or behind the merge point at which the virtual queue joins) may be used to inform management of the virtual queue. For example, location data can be used to determine the total number of users in the physical queue and the de-queuing rate may be varied so that the total wait time in the physical queue does not rise above a predetermined limit. Alternatively, the satisfaction of users in the physical queue may be determined via user behaviour data and this may be used as an input by the queue management unit to vary the management of the virtual queue.

In particular, it may be advantageous to increase the use of the virtual queue but also maintain user satisfaction in the physical queue. In this case, user satisfaction can be determined by one or more of (1) location data, e.g. indicating whether users are leaving the physical queue; (2) device usage data, indicating users are using the user device/smart phone for other uses; (3) a response to a satisfaction query, for example a message may be sent to user devices asking them whether they are satisfied or to rate their satisfaction. Their response may be used by the queue management unit to vary how the virtual queue is managed. For example if satisfaction is falling, the rate at which users in the virtual queue are de-queued and allowed to join at the merge point may be reduced.

What is claimed is:

1. A virtual queuing system for managing a virtual queue for a resource within a site having one or more resources, the system comprising a plurality of user devices and a virtual queue management unit, wherein each user device is configured to:
    allow a user to join a virtual queue for the resource by creating a virtual queue entry associated with the user device;

wherein the virtual queue management unit is configured to:
    maintain a virtual queue comprising a sequence of virtual queue entries;
    receive user behaviour data associated with the plurality of user devices located within the site, the user behaviour data including user location data received from location sensors of the plurality of user devices;
    estimate a number of users in a physical queue at an access point to the resource using user location data received from location sensors a set of user devices, among the plurality of user devices, that are associated with current and/or removed virtual queue entries; and
    autonomously manage the virtual queue by:
        determining when the number of users in the physical queue drops below a threshold value based on the user location data received from the location sensors of the set of user devices;
        determining one or more virtual queue entries within the virtual queue corresponding to user devices relatively closer to the resource than others in the virtual queue using the user location data received from the location sensors of the set of user devices; and
        providing user devices associated with the one or more virtual queue entries that are relatively closer to the resource than others in the virtual queue with the access pass for accessing the resource;
    wherein the virtual queue management unit is further configured to:
        vary the management of the virtual queue in response to the received user behaviour data by autonomously varying one or more of:
            a number of virtual queue entries removed from the virtual queue and provided with the access pass;
            a de-queuing rate at which virtual queue entries are removed from the virtual queue and provided with the access pass;
            a selection of which virtual queue entries within the virtual queue are removed; and
            a set time period in which the access pass remains valid and usable to access the resource.

2. The virtual queuing system of claim 1, wherein user behaviour data comprises one or more of:
    user device usage data received from a user device;
    usage data associated with a remote device or system in communication with the virtual queuing system; and
    user profile data.

3. The virtual queuing system of claim 1, wherein the user behaviour data received by the virtual queue management unit comprises user behaviour data associated with one or more virtual queue entries that have been removed from the virtual queue.

4. The virtual queuing system of claim 1, wherein the virtual queue management unit is configured to:
    determine a number of users to be removed from the virtual queue or a de-queuing rate at which virtual queue entries are removed from the virtual queue using the user location data received from the location sensors of one or more user devices among the set of user devices.

5. The virtual queuing system of claim 1, wherein the virtual queue management unit is configured to:
    determine a throughput value for the resource using the user location data received from the location sensors of a subset of user devices associated with virtual queue entries removed from the queue; and use the throughput value to determine a de-queuing rate at which virtual queue entries are removed from the virtual queue.

6. The virtual queuing system of claim 1, wherein the virtual queue management unit is configured to:

determine a de-queuing rate at which virtual queue entries are removed from the virtual queue using a throughput value for the resource and an adjustment factor representing a forecasted proportion of users provided with the access pass who will not access the resource, such that the de-queuing rate is greater than the throughput of the resource, wherein the adjustment factor is determined based on received user behaviour data associated with current or removed virtual queue entries.

7. The virtual queuing system of claim 6, wherein the virtual queue management unit is configured to determine the adjustment factor based on one or both of the user location data and usage data received from among the set of user devices.

8. The virtual queuing system of claim 6, wherein the virtual queue management unit is configured to determine the adjustment factor by inputting the received user behaviour data into a machine learning model trained using historical user behaviour data to predict whether a user will access the resource from the input user behaviour data.

9. The virtual queuing system of claim 1, wherein the queue management unit is configured to remove a first virtual queue entry ahead of a second virtual queue entry, the second virtual queue entry being at a relatively further advanced position in the virtual queue, when the queue management unit determines that the first virtual queue entry is associated with a user more likely to access the resource based on the received user behaviour data.

10. The virtual queuing system of claim 1, wherein the virtual queue management unit is configured to determine the number of users in the physical queue and control the number of virtual queue entries removed from the virtual queue and provided with the access pass to maintain a target number of users in the physical queue.

11. The virtual queueing system of claim 10, wherein the virtual queue management unit is configured to determine the number of virtual queue entries removed from the virtual queue using an adjustment factor representing a forecasted proportion of users provided with the access pass who will not access the resource, such that the number of virtual queue entries removed from the virtual queue is greater than the number required to maintain the target number of users in the physical queue, and wherein the adjustment factor is determined based on received user behaviour data associated with current or removed virtual queue entries.

12. The virtual queuing system of claim 1, wherein the virtual queue management unit is configured to determine a set time period that an access pass provided to a user device remains active and usable to access a resource, wherein the set time period may be determined according to one or more of:

a distance between the user and the resource, determined based on the user location data received from location sensor of the user device;

the number of people determined to be in a physical queue for the resource; and usage data received from the user device.

13. Queuing system of claim 1, wherein the virtual queue management unit is configured for use with a resource having a physical queue at an entrance to the resource, the access pass provided to a user device allowing the user to access the resource at a merge point in the physical queue, and wherein the virtual queue management unit is configured to receive user behaviour data from user devices associated with users in the physical queue and autonomously vary the management of the virtual queue in response to the received user behaviour data.

14. The virtual queuing system of claim 13, wherein the user behaviour data associated with users in the physical queue comprises user sentiment data, where user sentiment data is determined based on one or more of:

the user location data from a location sensor of a user device;

user device usage data; and a user response to a message sent to a user device.

15. Queuing system of claim 14, wherein the virtual queue management unit is configured to autonomously vary a dequeuing rate or the number of users removed the virtual queue and provided with an access pass based on user sentiment data received from the users within the physical queue.

16. The virtual queuing system of claim 1, wherein the access pass provided to a user device allows the user to access the resource at a merge point in the physical queue, and wherein the virtual queue management unit is configured to determine the number of users in the physical queue and vary management of the virtual queue in response to the number of users in the physical queue, wherein the merge point is at an advanced position in the physical queue.

17. A virtual queuing system for managing a plurality of virtual queues for a plurality of resources within a site, the system comprising a plurality of user devices and a virtual queue management unit, wherein each user device is configured to:

allow a user to join a virtual queue for a resource among the plurality of resources by creating a virtual queue entry associated with the user device;

wherein the virtual queue management unit is configured to:

maintain the plurality of virtual queues for the plurality of resources, each virtual queue comprising a sequence of virtual queue entries; and autonomously manage the virtual queue by sequentially removing virtual queue entries from the virtual queue and providing each user device associated with a removed virtual queue entry with an electronic access key configured to be authenticated by an electronic device to allow the user to access the resource;

wherein the virtual queue management unit is further configured to:

receive user behaviour data associated with one or more user devices located within the site, the user behaviour data including user location data received from location sensors of the one or more user devices;

determine when the user location data received from a location sensor of a user device indicates that the user associated with the user device is outside a defined perimeter of the site;

autonomously remove virtual queues associated with the user from each of the virtual queue entries without providing that user an access pass; and autonomously vary the management of the virtual queue in response to the received user behaviour data by varying one or more of:
- a number of virtual queue entries removed from the virtual queue and provided with a barcode;
- a de-queuing rate at which virtual queue entries are removed from the virtual queue and provided with a barcode;
- a selection of which virtual queue entries within the virtual queue are removed; and
- a set time period in which the barcode remains valid and usable to access the resource.

18. A virtual queuing system for managing a virtual queue for a resource having a physical queue at an entrance to the resource, the system comprising:

a plurality of user devices and a virtual queue management unit, wherein each user device is configured to:

allow a user to join a virtual queue for the resource by creating a virtual queue entry associated with the user device;

wherein the virtual queue management unit is configured to:

maintain a virtual queue comprising a sequence of virtual queue entries; and autonomously manage the virtual queue by sequentially removing virtual queue entries from the virtual queue and providing each user device associated with a removed virtual queue entry with an access pass allowing the user to access the resource;

wherein the virtual queue management unit is further configured to:

determine a number of users in the physical queue;

receive user behaviour data associated with one or more user devices, user behaviour data including user location data received from location sensors of the one or more user devices; and autonomously vary the management of the virtual queue in response to the received user behaviour data in order to maintain the number of users in the physical queue at or below a target number of users;

wherein varying the management of the virtual queue comprises autonomously varying one or more of:
(i) a number of virtual queue entries removed from the virtual queue and provided with an access pass;
(ii) a de-queuing rate at which virtual queue entries are removed from the virtual queue and provided with an access pass;
(iii) a selection of which virtual queue entries within the virtual queue are removed; and
(iv) a set time period in which the access pass remains valid and usable to access the resource, based on a physical location of the user relative to the entrance of the resource determined using the user location data received from the location sensors of the one or more user devices.

* * * * *